United States Patent

Fukuchi

(10) Patent No.: US 10,050,246 B2
(45) Date of Patent: Aug. 14, 2018

(54) BINDER FOR RECHARGEABLE BATTERY, SEPARATOR FOR RECHARGEABLE BATTERY INCLUDING SAME, AND RECHARGEABLE BATTERY INCLUDING SAME

(71) Applicant: SAMSUNG SDI CO., LTD., Yongin-si, Gyeonggi-do (KR)

(72) Inventor: Iwao Fukuchi, Yokohama (JP)

(73) Assignee: Samsug SDI Co., Ltd., Gyeonggi-Do (KR)

(*) Notice: Subject to any disclaimer, the term of this patent is extended or adjusted under 35 U.S.C. 154(b) by 184 days.

(21) Appl. No.: 14/960,042

(22) Filed: Dec. 4, 2015

(65) Prior Publication Data

US 2016/0190535 A1    Jun. 30, 2016

(30) Foreign Application Priority Data

Dec. 26, 2014  (JP) .................................. 2014-265054
Aug. 20, 2015  (KR) ........................ 10-2015-0117526

(51) Int. Cl.
H01M 2/16        (2006.01)
H01M 4/525       (2010.01)
H01M 4/505       (2010.01)
H01M 10/0525     (2010.01)

(52) U.S. Cl.
CPC ......... *H01M 2/1653* (2013.01); *H01M 2/166* (2013.01); *H01M 2/1646* (2013.01); *H01M 2/1686* (2013.01); *H01M 4/505* (2013.01); *H01M 4/525* (2013.01); *H01M 10/0525* (2013.01)

(58) Field of Classification Search
CPC ...... H01M 2/1653; H01M 2/166; H01M 2/16; H01M 2/14
See application file for complete search history.

(56) References Cited

U.S. PATENT DOCUMENTS

| 8,277,976 | B2 | 10/2012 | Ryu et al. | |
| 2006/0046149 | A1 | 3/2006 | Yong et al. | |
| 2012/0058379 | A1* | 3/2012 | Kishi | H01M 4/485 429/149 |
| 2013/0017429 | A1* | 1/2013 | Ha | H01M 2/1653 429/144 |
| 2014/0272523 | A1 | 9/2014 | Otsuka et al. | |

FOREIGN PATENT DOCUMENTS

| JP | 2013-211273 A | 10/2013 | |
| KR | 10-2006-0041650 A | 5/2006 | |
| KR | 10-0767966 B1 | 10/2007 | |
| KR | 10-2012-0038939 A | 4/2012 | |
| WO | WO 2013/058119 * | 4/2013 | ............ H01M 2/16 |

* cited by examiner

*Primary Examiner* — James Lee
(74) *Attorney, Agent, or Firm* — Knobbe, Martens, Olson & Bear, LLP

(57) ABSTRACT

A binder for a rechargeable battery includes an IPN-type acrylic-based resin including a hard segment having a glass transition temperature ranging from greater than or equal to about 50° C. and less than equal to about 200° C. and a soft segment having a glass transition temperature in a range of greater than or equal to about −100° C. and less than or equal to about 30° C.

10 Claims, 2 Drawing Sheets

BINDER FOR RECHARGEABLE BATTERY, SEPARATOR FOR RECHARGEABLE BATTERY INCLUDING SAME, AND RECHARGEABLE BATTERY INCLUDING SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57.

This application claims priority to and the benefit of Japanese Patent Application No. 2014-265054 filed in the Japanese Patent Office on Dec. 26, 2014, and Korean Patent Application No. 10-2015-0117526 filed in the Korean Intellectual Property Office on Aug. 20, 2015, the disclosures of which are incorporated in the entirety by reference.

BACKGROUND

Field

This disclosure relates to a binder for a rechargeable battery, a separator for a rechargeable battery, and a rechargeable battery including the same.

Description of the Related Technology

Recently, as various electronic devices have reduced in size and weight, there is a need for rechargeable batteries as a power source for these electronic devices that have high-capacity, and are smaller in size and weight as well.

In particular, research for developing a rechargeable lithium ion battery has been high and simultaneously, manufactured and sold due to benefits such as a high voltage, a long cycle-life, high energy density, and the like.

These characteristics of the rechargeable lithium ion battery may be largely affected by characteristics of an electrode, an electrolyte solution, other battery materials, and the like.

In particular, a separator for the rechargeable lithium ion battery influences the cycle characteristics of a rechargeable lithium ion battery. The separator may be manufactured by coating a slurry including an inorganic particle and a binder on a porous substrate and is called as a coating separator because it includes a coating layer including the inorganic particle and the binder formed on the porous substrate.

The binder plays a role of bonding the inorganic particle with a porous polyethylene film used as the porous substrate.

When this separator is used to manufacture a rechargeable lithium ion battery, cycle characteristics of the rechargeable lithium ion battery may be determined by characteristics of the binder bonding porous polyethylene (PE) with ceramic particles (a kind of inorganic particle), and also by characteristics of the ceramic particles themselves.

Particularly, when ceramic particles having high heat resistance are used to form the coating layer, a battery having a high voltage and high-capacity characteristics may be manufactured. However, the ceramic particles having high heat-resistance may sufficiently exert their own characteristics, when the binder stably maintains the structure of the ceramic coating layer during charge and discharge of the rechargeable lithium ion battery. In other words, the high heat-resistance ceramic particles need to maintain their stability inside the separator.

In addition, the binder needs to firmly bond the separator with each electrode.

Therefore, a binder having excellent heat resistance and adherence is required.

Specifically, a binder composition (hereinafter, referred to as PVDF-based binder) obtained by mixing a polyvinylidene fluoride (PVDF)-based polymer as a representative binder for an electrode with an organic solvent such as N-methyl-2-pyrrolidone (NMP) and the like tends to be used as the binder for the coating separator. However, the PVDF-based binder needs to be used in an excessive amount for a separator to maintain sufficient adherence and is difficult to continuously maintain the stable structure of a coating layer by impregnating an electrolyte solution and moving lithium ions during charge and discharge of a rechargeable lithium ion battery.

In order to solve this problem, a method of improving adherence to an inorganic oxide by using porous polyethylene, a binder having a strongly adhering chemical structure, and a silane coupling agent, a method of using a binder including an IPN (interpenetrating polymer network)-type resin obtained by polymerizing a PVDF-based polymer and a hydrophilic polymer (unsaturated carboxylic acid) (for example, Japanese Patent Laid-Open Publication No. 2013-211273), or the like has been suggested.

However, the binder satisfies the adherence requirement to either the porous polyethylene or the inorganic particle but does not have sufficient adherence to both of them.

Accordingly, when a rechargeable lithium battery using a coating separator formed by using the aforementioned binder is repeatedly charged and discharged, the coating layer is structurally changed and as a result battery capacity deteriorates.

SUMMARY

One embodiment provides a binder for a rechargeable battery having high heat resistance and strong adherence.

Another embodiment provides a separator for a rechargeable battery including the binder.

Yet another embodiment provides a rechargeable lithium battery including the binder.

According to one embodiment, a binder for a rechargeable battery includes an interpenetrating polymer network (IPN)-type acrylic-based resin including a hard segment having a glass transition temperature (Tg) of greater than or equal to about 50° C. and less than or equal to about 200° C.; and a soft segment having a glass transition temperature (Tg) of greater than or equal to about −100° C. and less than or equal to about 30° C.

In one embodiment, a binder for a rechargeable battery includes an interpenetrating polymer network (IPN)-type acrylic-based resin including a hard segment having a glass transition temperature (Tg) of greater than or equal to about 50° C. and less than or equal to about 150° C.; and a soft segment having a glass transition temperature (Tg) of greater than or equal to about −100° C. and less than or equal to about 30° C.

In one embodiment, the hard segment may have a Hildebrand solubility parameter of greater than or equal to about 21 and less than or equal to about 25, and soft segment may have a Hildebrand solubility parameter of greater than or equal to about 16 and less than or equal to about 25.

The hard segment may include at least one homopolymer selected from polymethacrylonitrile, poly N-(isobutoxymethyl)acrylamide and poly N-phenylmethacrylamide, and the soft segment may include at least one homopolymer selected from polybutyl acrylate and poly 2-cyanoethylacrylate.

According to one embodiment, a rechargeable lithium ion battery includes a positive electrode, a negative electrode, a separator, and a non-aqueous electrolyte; wherein, the separator further includes a substrate and a coating layer formed on at least one surface of the substrate, wherein the coating layer comprises the binder.

The coating layer may further include an inorganic particle.

According to one embodiment, a rechargeable lithium ion battery includes a positive electrode, a negative electrode, a separator, and a non-aqueous electrolyte; wherein the binder comprises an interpenetrating polymer network (IPN)-type acrylic-based resin including a hard segment having a glass transition temperature (Tg) of greater than or equal to about 50° C. and less than or equal to about 200° C.; and a soft segment having a glass transition temperature (Tg) of greater than or equal to about −100° C. and less than or equal to about 30° C.

According to one embodiment, a rechargeable lithium ion battery includes a positive electrode, a negative electrode, a separator, and a non-aqueous electrolyte; wherein the binder comprises an interpenetrating polymer network (IPN)-type acrylic-based resin including a hard segment having a glass transition temperature (Tg) of greater than or equal to about 50° C. and less than or equal to about 150° C.; and a soft segment having a glass transition temperature (Tg) of greater than or equal to about −100° C. and less than or equal to about 30° C.

According to one embodiment, a rechargeable lithium ion battery includes a positive electrode, a negative electrode, a separator, and a non-aqueous electrolyte; wherein the wherein the hard segment of binder has a Hildebrand solubility parameter of greater than or equal to about 21 and less than or equal to about 25, and the soft segment has a Hildebrand solubility parameter of greater than or equal to about 16 and less than or equal to about 25.

According to one embodiment, a rechargeable lithium ion battery includes a positive electrode, a negative electrode, a separator, and a non-aqueous electrolyte; wherein the hard segment of binder at least comprises one homopolymer selected from polymethacrylonitrile, poly N-(isobutoxymethyl)acrylamide and poly N-phenylmethacrylamide, and the soft segment comprises at least one homopolymer selected from polybutyl acrylate and poly 2-cyanoethylacrylate.

The binder according to one embodiment includes an IPN-type acrylic resin including a hard segment having a high glass transition temperature and a soft segment having a low glass transition temperature and thus has high heat resistance and strong adherence.

Therefore, the binder according to the one embodiment has high heat resistance and strong adherence.

DETAILED DESCRIPTION

Figure 1:
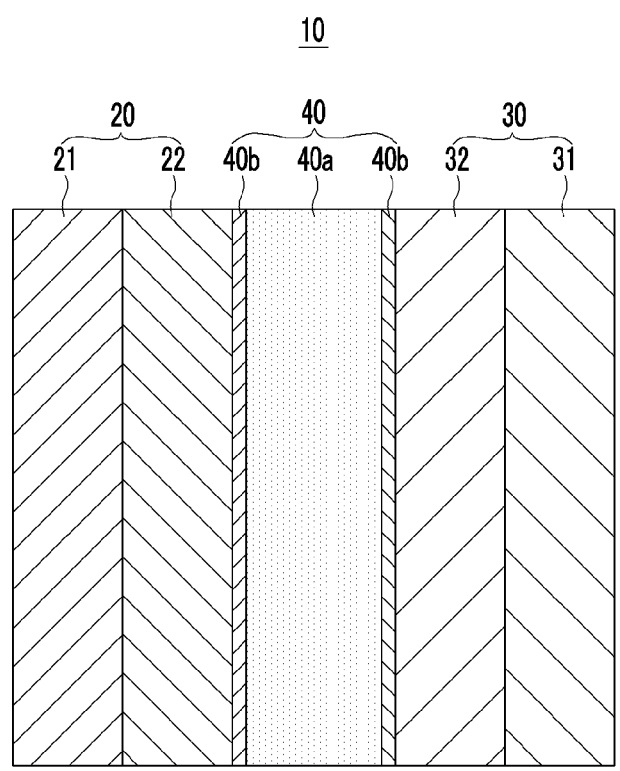
FIG. 1 is a cross sectional side view showing a rechargeable lithium ion battery according to one embodiment.

Hereinafter, embodiments are described in detail.

According to one embodiment, a binder for a rechargeable battery includes an interpenetrating polymer network (IPN)-type acrylic-based resin including a hard segment having a glass transition temperature (Tg) of greater than or equal to about 50° C. and less than or equal to about 200° C. and a soft segment having a glass transition temperature (Tg) of greater than or equal to about −100° C. and less than or equal to about 30° C.

The binder for a rechargeable battery has high heat resistance and strong adherence.

The hard segment may have a Hildebrand solubility parameter of greater than or equal to about 21 and less than or equal to about 25, and soft segment may have a Hildebrand solubility parameter of greater than or equal to about 16 and less than or equal to about 25. The binder having the properties may have high heat resistance and strong adherence.

The hard segment may include at least one selected from polymethacrylonitrile, poly N-(isobutoxymethyl)acrylamide and poly N-phenylmethacrylamide, and the soft segment may include at least one selected from polybutyl acrylate and poly 2-cyanoethylacrylate. The binder having the structure may have high heat resistance and strong adherence.

Another embodiment provides a separator for a rechargeable battery including a substrate and a coating layer formed on at least one surface of the substrate, wherein the coating layer includes the binder for a rechargeable battery. In other words, the separator according to one embodiment has a coating layer on the surface of a substrate, the coating layer is formed by using a binder composition including an interpenetrating polymer network (IPN)-type acrylic-based resin including a hard segment having a high glass transition temperature (Tg) and a soft segment having a glass transition temperature (Tg) as a binder, and the binder may improve heat resistance of the separator and close contacting property, that is, close contact strength between the substrate and the coating layer.

The separator may be manufactured by using a binder for a rechargeable battery having high heat resistance and strong adherence.

Accordingly, when the separator is used to manufacture a rechargeable battery, cycle characteristics and safety of the rechargeable battery may be improved.

The coating layer may further include an inorganic particle. When the coating layer further includes the inorganic particle, a rechargeable battery using the separator may have more improved cycle characteristics.

According to another embodiment, a rechargeable battery including the separator is provided. The rechargeable battery may have improved cycle characteristics.

Hereinafter, referring to the drawings, an embodiment of the present disclosure is illustrated in detail.

In the embodiments shown, constituent elements substantially having the same functional structure in the present specification and drawing are assigned by the same numeral and will not be repetitively illustrated.

Hereinafter, a rechargeable lithium ion battery according to an embodiment is described.

Exemplary Embodiment

Structure of Rechargeable Lithium Ion Battery

First, referring to FIG. 1, a structure of a rechargeable lithium ion battery 10 according to an embodiment is described.

The rechargeable lithium ion battery 10 includes a positive electrode 20, a negative electrode 30, a separator 40 and a non-aqueous electrolyte.

The rechargeable lithium battery 10 has a charge-reaching voltage (an oxidation reduction potential) of, for example, greater than or equal to about 4.3 V (vs. Li/Li$^+$) and less than or equal to about 5.0 V, and specifically, greater than or equal to about 4.5 V and less than or equal to about 5.0 V.

The rechargeable lithium ion battery 10 has no particular limit to a shape, and may have any shape such as a cylinder, a prism laminate-type, a button, and the like.

Positive Electrode 20

The positive electrode 20 includes a current collector 21 and a positive active material layer 22.

The current collector 21 may be any conductor, and may consist of, for example, aluminum, stainless steel, and nickel plated steel.

The positive active material layer 22 includes a positive active material, and may further include a conductive material a binder.

The positive active material may be, for example lithium-containing solid solution oxide, and may be any material that may electrochemically intercalate and deintercalate lithium ions without particular limitation.

The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.15 \leq z \leq 0.28$), $LiMn_xCo_yNi_zO_2$ ($0.3 \leq x \leq 0.85$, $0.10 \leq y \leq 0.3$, $0.10 \leq z \leq 0.3$), or $LiMn_{1.5}Ni_{0.5}O_4$.

The conductive material may be, for example, carbon black such as ketjen black, acetylene black, and the like, natural graphite, artificial graphite, and the like, but may be any one in order to improve conductivity of a positive electrode without limitation.

The binder may be, for example, polyvinylidene fluoride, an ethylene-propylene-diene terpolymer, a styrene-butadiene rubber, an acrylonitrile butadiene rubber, a fluororubber, polyvinyl acetate, polymethyl methacrylate, polyethylene, cellulose nitrate, and the like, and may not be particularly limited if it binds the positive active material and the conductive material on the current collector 21.

The positive active material layer 22 is prepared, for example, in the following method.

A positive active mass is manufactured by dry-mixing the positive active material, the conductive agent, and the binder.

Subsequently, the positive active mass is dispersed in an appropriate organic solvent to form positive active mass slurry, and the positive active mass slurry is coated on a current collector 21, dried, and compressed to form a positive active material layer.

Negative Electrode 30

The negative electrode 30 includes a current collector 31 and a negative active material layer 32.

The current collector 31 may be any conductor, and may consist of, for example, aluminum, stainless steel, nickel plated steel, and the like.

The negative active material layer 32 may be any negative active material layer of a rechargeable lithium battery.

For example, the negative active material layer 32 may include a negative active material, and may further include a binder.

The negative active material may be for example, graphite active material (artificial graphite, natural graphite, a mixture of artificial graphite and natural graphite, or natural graphite coated with artificial graphite), particulates of silicon, tin or oxides thereof or a mixture of the graphite active material therewith, particulates of silicon or tin, an alloy including silicon or tin as a main material and titanium oxide such as $Li_4Ti_5O_{12}$, and the like.

The oxide of silicon may be an oxide represented by $SiO_x$ ($0 \leq x \leq 2$).

The negative active material may be, for example metal lithium, and the like.

The binder may be the same as the binder of the positive active material layer 22.

A weight ratio of the negative active material and the binder is not particularly limited, and may be any weight ratio that is applicable to a conventional rechargeable lithium ion battery.

The negative material layer 32 is prepared, for example, in the following method.

First, a negative active material and a binder are dry-mixed to prepare a negative active mass mix.

The negative active mass mix is dispersed in an appropriate solvent to prepare a negative active mass slurry, and the negative active mass slurry is coated on a current collector 31 followed by drying and compressing the resultant to prepare a negative active material layer 32.

Separator 40

The separator 40 includes a substrate 40a and a coating layer (filler layer) 40b.

The substrate 40a is not particularly limited, and may be any separator in a rechargeable lithium ion battery.

The separator may include a porous layer or a non-woven fabric having excellent high-rate discharge performance, which may be used singularly or in a mixture thereof.

The substrate 40a may include a resin, for example a polyolefin-based resin such as polyethylene or polypropylene, a polyester-based resin such as polyethylene terephthalate or polybutylene terephthalate, polyvinylidene fluoride, a vinylidene fluoride (VDF)-hexafluoro propylene (HFP) copolymer, a vinylidene fluoride-perfluoro vinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoro acetone copolymer, a vinylidene fluoride-ethylene copolymer, a vinylidenefluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and the like.

The coating layer 40b includes an inorganic particle (filler) and a binder.

The inorganic particle may be, for example, an inorganic particle having high heat resistance.

Specific examples of this inorganic particle may be an oxide of silicon, aluminum, magnesium, and titanium and a hydroxide thereof, or the inorganic particle may be boehmite.

When this inorganic particle having high heat resistance is included in the separator 40, cycle characteristics of the rechargeable lithium ion battery 10 may be improved.

A particle diameter of the inorganic particle is not particularly limited but any particle diameter that an inorganic particle for the rechargeable lithium ion battery 10 has may be possible.

The binder may play a role of maintaining the inorganic particle inside the coating layer 40b, that is, inside the separator 40.

In one embodiment, the binder includes an IPN-type acrylic-based resin.

The IPN-type acrylic-based resin may include a hard segment having a glass transition temperature (Tg) of greater than or equal to about 50° C. and less than or equal to about 150° C.; and a soft segment having a glass transition temperature (Tg) of greater than or equal to about −100° C. and less than or equal to about 30° C. The IPN-type acrylic-based resin may be prepared by making IPN of the hard segment and the soft segment.

This IPN-type acrylic-based resin including the hard segment having a high glass transition temperature (Tg) and the soft segment having a low glass transition temperature (Tg) is used as a binder for the coating layer 40*b*, and accordingly, the heat resistance of the separator 40 and close contacting properties between the substrate 40*a* and the coating layer 40*b* may be improved.

In addition, when the coating layer 40*b* is formed by using the IPN-type acrylic-based resin as a binder in one embodiment, close contact strength between the separator 40 and an electrode (the positive electrode 20 and the negative electrode 30) may be improved.

As the close contact strength is improved, therefore safety and cycle-life of the rechargeable lithium ion battery 10 may also be improved.

On the other hand, the acrylic-based resin as a binder according to one embodiment may be, for example, examined to have an IPN-type structure by comparing SEM of a polymer particulate of the hard segment with SEM of a polymer particulate obtained by reacting the soft segment with the hard segment to see both of the polymer particulates have a similar structure.

When the particulates have a similar structure, a monomer of the soft segment reacted with the polymer particulate of the hard segment is absorbed in the polymer particulate of the hard segment and polymerized therewith, results in formation of an IPN-type polymer.

In addition, a glass transition temperature (Tg) in one embodiment indicates a glass transition temperature (Tg) when each hard and soft segment is a homopolymer, and each glass transition temperature (Tg) of the hard and soft segments is measured by using differential scanning calorimetry (DSC).

The hard segment may have a Hildebrand solubility parameter value (hereinafter, referred to be a "SP value") of greater than or equal to about 21 and less than or equal to about 25.

The hard segment having a SP value of greater than or equal to about 21 to less than or equal to about 25 may have an effect of suppressing excessive swelling about an electrolyte.

The hard segment having this SP value may be, for example, polymethacrylonitrile (SP of 23.7), poly N-(isobutoxymethyl)acrylamide (SP of 21.2), poly N-phenylmethacrylamide (SP of 22.4), and the like.

These hard segments may be used alone or a combination of two or more than two.

In addition, the soft segment may have a SP value ranging from greater than or equal to about 16 and less than or equal to about 25.

When the soft segment has a SP value in a range of greater than or equal to about 16 to less than or equal to about 25, compatibility of the soft segment with the hard segment may be prevent from excessive deterioration.

The soft segment having this SP value may be, for example, polybutyl acrylate (SP of 17.5), poly 2-cyanoethylacrylate (SP of 21.6), and the like.

These soft segments may be used alone or a combination of two or more than two.

When the hard segment and the soft segment respectively have a SP value within the ranges, the hard and soft segments have a smaller absolute SP difference and thus higher compatibility.

Accordingly, the obtained acrylic-based resin may easily from an IPN-type structure.

The separator 40 may be, for example, manufactured in the following method.

First of all, an inorganic particle dispersion liquid and a binder solution are prepared.

A solvent of the inorganic particle dispersion liquid has no particular limitation but may include any solvent in which inorganic particles can be dispersed.

The solvent of the inorganic particle dispersion liquid may appropriately be used as the same solvent for the binder solution.

The solvent of the binder solution may include any solvent without a particular limitation, if a binder can be dissolved therein.

This solvent may be for example N-methyl pyrrolidone (NMP) and the like.

Subsequently, the inorganic particle dispersion liquid and the binder solution are mixed to prepare a slurry.

The concentration of the slurry may be adjusted by adding the same solvent as the solvent for the binder solution thereto.

In addition, a different kind of binder, for example, a PVDF-based binder (a binder including PVDF as a main chain) may be further added to the slurry.

Then, the slurry is applied (for example, coated) on the substrate 40*a*, and dried to prepare a coating layer 40*b*.

The substrate 40*a* may be dipped in the slurry.

According to this process, the separator 40 is prepared.

On the other hand, even though in FIG. 1, the coating layer 40*b* is formed on the surface of the substrate 40*a*, the coating layer 40*b* may be formed in the thin pores of the substrate 40*a*.

The non-aqueous electrolyte may be any non-aqueous electrolyte of a conventional rechargeable lithium battery without limitation.

The non-aqueous electrolyte may have a composition where an electrolytic salt is added in a non-aqueous solvent. The non-aqueous solvent may be, for example, cyclic carbonate esters such as propylene carbonate, ethylene carbonate, butylene carbonate, chloroethylene carbonate, or vinylene carbonate; cyclic esters such as γ-butyrolactone, or γ-valero lactone; linear carbonates such as dimethyl carbonate, diethyl carbonate, or ethyl methyl carbonate; linear esters such as methyl formate, methyl acetate, or butyric acid methyl; tetrahydrofuran or a derivative thereof; ethers such as 1,3-dioxane, 1,4-dioxane, 1,2-dimethoxyethane, 1,4-dibutoxyethane, or methyl diglyme; nitriles such as acetonitrile, or benzonitrile; dioxolane or a derivative thereof; ethylene sulfide, sulfolane, sultone or a derivative thereof, and the like which, may be used singularly or as a mixture of two or more, without limitation.

The lithium salt may be, for example, an inorganic ion salt including lithium (Li), sodium (Na) or potassium (K) such as $LiClO_4$, $LiBF_4$, $LiAsF_6$, $LiPF_6$, $LiPF_{6-x}(C_nF_{2n+1})_x$ ($1<x<6$, $n=1$ or $2$), LiSCN, LiBr, LiI, $Li_2SO_4$, $Li_2B_{10}Cl_{10}$, $NaClO_4$, NaI, NaSCN, NaBr, $KClO_4$, KSCN and the like, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfate, lithium octyl sulfate, lithium dodecylbenzene sulphonate. These may be used singularly or in a mixture of two or more.

The concentration of the electrolytic salt may be the same as that of a non-aqueous electrolyte used in a conventional rechargeable lithium battery, and is not particularly limited.

In the present disclosure, an electrolyte solution including an appropriate lithium compound (electrolytic salt) at a concentration of about 0.8 mol/L to about 1.5 mol/L may be used.

The non-aqueous electrolyte may further include various additives.

The additives may include a negative electrode-acting additive, a positive electrode-acting additive, an ester-based additive, a carbonate ester-based additive, a sulfuric acid ester-based additive, a phosphoric acid ester-based additive, a boric acid ester-based additive, an acid anhydride additive, and an electrolytic additive. Of these, at least one may be added to the non-aqueous electrolyte, or a plurality of additives may be added to the non-aqueous electrolyte.

Method of Preparing Rechargeable Lithium Ion Battery

Hereinafter, a method of preparing a rechargeable lithium ion battery 10 is described.

The positive electrode 20 is prepared, for example, in the following method.

First, a mixture of a positive active material, a conductive material, and a binder is dispersed in a solvent (for example N-methyl-2-pyrrolidone) to prepare a slurry.

Subsequently, the slurry is applied (for example, coated) on a current collector 21 and dried to form a positive active material layer 22.

The applying method is not particularly limited, and for example uses a knife coater, a gravure coater, and the like.

The below applying process may be performed according to the same method.

Subsequently, the positive active material layer 22 is compressed to form a positive electrode 20.

The negative electrode 30 may be manufactured according to the same method as that of the positive electrode 20.

First, a mixture of a negative active material and a binder is dispersed in a solvent (for example N-methyl-2-pyrrolidone, or water) to prepare a slurry.

The slurry is applied (for example, coated) on a current collector 31 and dried to form a negative active material layer 32.

Subsequently, the negative active material layer 32 is compressed to form a negative electrode 30.

The separator 40 may be, for example prepared as follows.

First, an inorganic particle dispersion liquid and a binder solution are prepared. Subsequently, the inorganic particle dispersion liquid and the binder solution are mixed to prepare a slurry.

The same solvent as the solvent of the binder solution may be added to the slurry to control concentrations of the inorganic particle and binder.

Subsequently, the slurry is applied (for example, coated) on the substrate 40a, and dried to prepare a coating layer 40b.

Herein, the substrate 40a may be dipped in the slurry. According to the process, the separator 40 is prepared.

Subsequently, the separator 40 is disposed between the positive electrode 20 and the negative electrode 30 to prepare an electrode structure.

Then, the electrode structure is prepared to have a desired shape (for example, a cylinder, a prism, a laminate, a button, and the like) and then inserted into a container having the same shape.

In addition, a desired electrolyte is injected into the container in order to impregnate the electrolyte into pores of the separator. In this way, a rechargeable lithium battery is prepared.

When the separator 40 manufactured by using a binder according to one embodiment is used to manufacture a rechargeable lithium ion battery 10, the cycle characteristics of the rechargeable lithium ion battery 10 may be improved.

In addition, the separator 10 is suppressed from a thermal shrinkage and thus may suppress thermal runaway of the rechargeable lithium ion battery 10 and as a result, improve the safety of the rechargeable lithium ion battery 10.

Hereinafter, examples of the present disclosure and comparative examples are described. These examples, however, are not in any sense to be interpreted as limiting the scope of the disclosure.

1. Synthesis of Binder Resin

SYNTHESIS EXAMPLE 1

Synthesis of Polymethacrylonitrile (PMAN) Particulate Solution (Hard Segment (Tg of Homopolymer: 67° C.))

600 g of distilled water was put in a 1000 ml four-necked flask equipped with an agitator, a thermometer, and a cooling tube, its internal pressure was three times repetitively reduced down to 10 mmHg with a diaphragm pump and then increased to normal pressure with nitrogen.

Subsequently, sodium dodecyl sulfate (7.5 g, 0.026 mol) dissolved in 20 g of degassified distilled water was added thereto, in addition, methacrylonitrile (150 g, 2.236 mol) and ammonium persulfate (2.55 g, 0.0112 mol, 0.005 equivalent) were added thereto, and the mixture was agitated at 600 rpm.

The reaction solution was reacted for 6 hours, while stably maintaining the temperature between 70° C. to 80° C. by controlling the heat treatment.

The reaction product was cooled down to room temperature and resulted in a product of 20.0% of a nonvolatile (NV) component (a theoretical value of 21%), when measured by taking about 2 ml sample therefrom.

SYNTHESIS EXAMPLE 2

Synthesis of PolyN-(isobutoxymethyl)acrylamide (PIBMAAM) Particulate Solution (Tg of Hard Segment (Homopolymer: 135° C.))

600 g of distilled water was put in a 1000 ml four-necked flask equipped with an agitator, a thermometer, and a cooling tube, and its internal pressure was three times repetitively reduced down to 10 mmHg with a diaphragm pump and then increased to normal pressure with nitrogen.

Then, sodium dodecyl sulfate (7.5 g, 0.026 mol) dissolved in 20 g of degassified distilled water was added thereto, in addition, N-(isobutoxymethyl)acrylamide (150 g, 1.048 mol) and ammonium persulfate (1.19 g, 0.00524 mol, 0.005 equivalent) were added thereto, and the mixture was agitated at 600 rpm.

The reaction solution was reacted for 6 hours, while stably maintaining the temperature between 70° C. to 80° C. by controlling the heat treatment.

The reaction product was cooled down to room temperature, 150 g of water was removed with a rotary evaporator, and then, diluted with distilled water until its nonvolatile (NV) component reached 20.0%.

SYNTHESIS EXAMPLE 3

Synthesis of PolyN-(isobutylmethyl)acrylamide (PIBMAAM) Particulate Solution (Hard Segment (Tg of Homopolymer: 165° C.))

600 g of distilled water was put in a 1000 ml 4-necked flask equipped with an agitator, a thermometer, and a cooling tube, and its internal pressure was three times repetitively reduced down to 10 mmHg with a diaphragm pump and recovered up to a normal pressure.

Subsequently, sodium dodecyl sulfate (7.5 g, 0.026 mol) dissolved in 20 g of degassified distilled water was added thereto, in addition, methacrylonitrile (150 g, 0.931 mol) and ammonium persulfate (0.935 g, 0.00465 mol, 0.005 equivalent) were added thereto, and the mixture was agitated at 600 rpm.

The reaction solution was reacted for 6 hours, while stably maintaining the temperature between 70° C. to 80° C. by controlling the heat treatment.

The reaction product was cooled down to room temperature, 150 g of water was removed with a rotary evaporator, and then, diluted with distilled water until its nonvolatile (NV) component reached 20.0%.

2. Synthesis of Binder

EXAMPLE 1

Synthesis of Polymethacrylonitrile (PMAN)-Polybutyl acrylate (PBu) IPN Polymer (PMAN:PBu=60:40)

100 g of the polymethacrylonitrile particulate solution (a hard segment, NV: 20.0%, converted as weight of resin part: 20 g) according to Synthesis Example 1 and 67.5 g of distilled water were put in a 1000 ml 4-necked flask equipped with an agitator, a thermometer, and a cooling tube, and its internal pressure was five times repetitively reduced down to 25 mmHg with a diaphragm pump and then increased to normal pressure with nitrogen.

Then, butyl acrylate (a soft segment (Tg of a homopolymer: −55° C., 13.5 g, 0.105 mol) was added thereto, and the mixture was agitated at 60° C. for 2 hours.

Subsequently, azoisobutyronitrile (AIBN, 0.120 g, 0.53 mmol, 0.005 equivalent) was added thereto, and the resulting mixture was reacted for 6 hours, while stably maintaining the temperature between 70° C. to 80° C. by controlling the heat treatment.

The reaction product was cooled down to room temperature and then, diluted with distilled water until its nonvolatile (NV) component reached 15.0%.

EXAMPLE 2

Synthesis of Polymethacrylonitrile (PMAN)-Polybutylacrylate (PBu) IPN Polymer (PMAN:PBu=70:30)

A polymethacrylonitrile (PMAN)-polybutyl acrylate (PBu) IPN polymer was prepared according to the same method as Example 1 except for using distilled water (43.5 g), butyl acrylate (8.6 g, 0.067 mol), and AIBN (0.077 g, 0.34 mmol, 0.005 equivalent).

EXAMPLE 3

Synthesis of Polymethacrylonitrile (PMAN)-Polybutyl acrylate (PBu) IPN Polymer (PMAN:PBu=80:20)

A polymethacrylonitrile (PMAN)-polybutyl acrylate (PBu) IPN polymer was prepared according to the same method as Example 1 except for using distilled water (25.5 g), butyl acrylate (5.0 g, 0.039 mol), and AIBN (0.044 g, 0.20 mmol, 0.005 equivalent).

EXAMPLE 4

Synthesis of Polymethacrylonitrile (PMAN)-Poly2-cyanoethylacrylate (PCEA) IPN Polymer (PMAN:PCEA=60:40)

100 g of the polymethacrylonitrile particulate solution (a hard segment, NV: 20.0%, converted as weight of resin part: 20 g) synthesized according to Synthesis Example 1 and 67.5 g of distilled water were put in a 1000 ml 4-necked flask equipped with an agitator, a thermometer, and a cooling tube, and its internal pressure was 5 times repetitively reduced down to 25 mmHg with a diaphragm pump and then increased to normal pressure with nitrogen.

Then, 2-cyanoethylacrylate (a soft segment (Tg of a homopolymer: 4° C.), 13.5 g, 0.095 mol) was added thereto, and the mixture was agitated at 60° C. for 2 hours.

Subsequently, azoisobutyronitrile (AIBN, 0.108 g, 0.47 mmol, 0.005 equivalent) was added thereto, and the obtained mixture was reacted for 6 hours, while stably maintaining the temperature between 70° C. to 80° C. by controlling the heat treatment.

The reaction product was cooled down to room temperature and then, diluted with distilled water until its nonvolatile (NV) component reached 15.0%.

EXAMPLE 5

Synthesis of Polymethacrylonitrile (PMAN)-Poly2-cyanoethylacrylate (PCEA) IPN Polymer (PMAN:PCEA=70:30)

A polymethacrylonitrile (PMAN)-poly2-cyanoethylacrylate (PCEA) IPN polymer was prepared according to the same method as Example 4 except for using distilled water (25.5 g), 2-cyanoethylacrylate (8.6 g, 0.060 mol), and AIBN (0.069 g, 0.30 mmol, 0.005 equivalent).

EXAMPLE 6

Synthesis of Polymethacrylonitrile (PMAN)-Poly2-cyanoethylacrylate (PCEA) IPN Polymer (PMAN:PCEA=70:30)

A polymethacrylonitrile (PMAN)-poly2-cyanoethylacrylate (PCEA) IPN polymer was prepared according to the same method as Example 4 except for using distilled water (25.5 g), 2-cyanoethylacrylate (5.0 g, 0.035 mol), and AIBN (0.040 g, 0.18 mmol, 0.005 equivalent).

EXAMPLE 7

Synthesis of Poly N-(isobutoxymethyl)acrylamide (PIBMAAM)-Poly2-cyanoethylacrylate (PCEA) IPN Polymer (PIBMAAM:PCEA=60:40)

100 g of the poly N-(isobutoxymethyl)acrylamide particulate solution (a hard segment, NV: 20.0%, converted as weight of resin part: 20 g) synthesized according to Synthesis Example 2 and 67.5 g of distilled water were put in a 1000 ml 4-necked flask equipped with an agitator, a thermometer, and a cooling tube, and its internal pressure was 5 times repetitively reduced down to 25 mmHg with a diaphragm pump and then increased to normal pressure with nitrogen.

Then, 2-cyanoethylacrylate (a soft segment (Tg of a homopolymer: 4° C.), 13.5 g, 0.095 mol) was added thereto, and the mixture was agitated at 60° C. for 2 hours.

Subsequently, azoisobutyronitrile (AIBN, 0.108 g, 0.47 mmol, 0.005 equivalent) was added thereto, and the obtained mixture was reacted for 6 hours, while stably maintaining the temperature between 70° C. to 80° C. by controlling the heat treatment.

The reaction product was cooled down to room temperature and diluted with distilled water until its nonvolatile (NV) component reached 15.0%.

EXAMPLE 8

Synthesis of Poly N-(isobutoxymethyl) acrylamide (PIBMAAM)-Poly2-cyanoethylacrylate (PCEA) IPN Polymer (PIBMAAM:PCEA=70:30)

A poly N-(isobutoxymethyl)acrylamide (PIBMAAM)-poly2-cyanoethylacrylate (PCEA) IPN polymer was prepared according to the same method as Example 7 except for using distilled water (25.5 g), 2-cyanoethylacrylate (8.6 g, 0.060 mol), and AIBN (0.069 g, 0.30 mmol, 0.005 equivalent).

EXAMPLE 9

Synthesis of Poly N-(isobutoxymethyl)acrylamide (PIBMAAM)-Poly2-cyanoethylacrylate (PCEA) IPN Polymer (PIBMAAM:PCEA=80:20)

A poly N-(isobutoxymethyl)acrylamide (PIBMAAM)-poly2-cyanoethylacrylate (PCEA) IPN polymer was prepared according to the same method as Example 7 except for using distilled water (25.5 g), 2-cyanoethylacrylate (5.0 g, 0.035 mol), and AIBN (0.040 g, 0.18 mmol, 0.005 equivalent).

EXAMPLE 10

Synthesis of Poly N-phenylmethacrylamide (PPMAAM)-Poly2-cyanoethylacrylate (PCEA) IPN Polymer (PIBMAAM:PCEA=60:40)

100 g of the poly N-phenylmethacrylamide particulate solution (a hard segment, NV: 20.0%, converted as weight of resin part: 20 g) synthesized according to Synthesis Example 3 and 67.5 g of distilled water were put in a 1000 ml 4-necked flask equipped with an agitator, a thermometer, and a cooling tube, and its internal pressure was five times repetitively reduced down to 25 mmHg with a diaphragm pump and then increased to normal pressure with nitrogen.

Then, 2-cyanoethylacrylate (a soft segment (Tg of a homopolymer: 4° C.), 13.5 g, 0.095 mol) was added thereto, and the mixture was agitated at 60° C. for 2 hours.

Subsequently, azoisobutyronitrile (AIBN, 0.108 g, 0.47 mmol, 0.005 equivalent), and the mixture was reacted for 6 hours, while stably maintaining the temperature between 70° C. to 80° C. by controlling the heat treatment.

The reaction product was cooled down to room temperature and diluted with distilled water until its nonvolatile (NV) component reached 15.0%.

EXAMPLE 11

Synthesis of Poly N-phenylmethacrylamide (PPMAAM)-Poly2-cyanoethylacrylate (PCEA) IPN Polymer (PIBMAAM:PCEA=70:30)

A poly N-phenylmethacrylamide (PPMAAM)-poly2-cyanoethylacrylate (PCEA) IPN polymer was prepared according to the same method as Example 10 except for using distilled water (25.5 g), 2-cyanoethylacrylate (8.6 g, 0.060 mol), and AIBN (0.069 g, 0.30 mmol, 0.005 equivalent).

EXAMPLE 12

Synthesis of Poly N-phenylmethacrylamide (PPMAAM)-Poly2-cyanoethylacrylate (PCEA) IPN Polymer (PIBMAAM:PCEA=80:20)

A poly N-phenylmethacrylamide (PPMAAM)-poly2-cyanoethylacrylate (PCEA) IPN polymer was prepared according to the same method as Example 10 except for using distilled water (25.5 g), 2-cyanoethylacrylate (5.0 g, 0.035 mol), and AIBN (0.040 g, 0.18 mmol, 0.005 equivalent).

3. Preparation of Coating Separator

EXAMPLE 13

A boehmite/binder mixed solution was prepared by adding 185 g of distilled water, 45.3 g of the binder according to Example 1 (NV conversion: 6.8 g, 10 wt % based on the entire weight of the boehmite) to 61.4 g of boehmite C20 (TAIMEI CHEMICALS CO., LTD. Tokyo, Japan) and 6.8 g of boehmite ACTILOX-200SM (Nabaltec AG; Schwandorf, Germany), agitating this mixture until it became slurry, and then, dispersing the slurry with a bead mill (a zirconia bead, 0.5 φ, a charge rate: 60%, 2000 rpm, 4 times pass).

The boehmite/binder mixed solution was coated on a commercially-available 12 μm-thick polyethylene microporous film (T12-507, <SK Innovation Co., Ltd.; Seoul, Korea) and dried by using a gravure coater until its coating amount (a loading amount) became 3.0 g/m² after the drying, manufacturing a coating separator.

EXAMPLE 14

A coating separator was manufactured according to the same method as Example 13 except for using the binder according to Example 2.

EXAMPLE 15

A coating separator was manufactured according to the same method as Example 13 except for using the binder according to Example 3.

EXAMPLE 16

A coating separator was manufactured according to the same method as Example 13 except for using the binder according to Example 4.

EXAMPLE 17

A coating separator was manufactured according to the same method as Example 13 except for using the binder according to Example 5.

EXAMPLE 18

A coating separator was manufactured according to the same method as Example 13 except for using the binder according to Example 6.

EXAMPLE 19

A coating separator was manufactured according to the same method as Example 13 except for using the binder according to Example 7.

EXAMPLE 20

A coating separator was manufactured according to the same method as Example 13 except for using the binder according to Example 8.

EXAMPLE 21

A coating separator was manufactured according to the same method as Example 13 except for using the binder according to Example 9.

EXAMPLE 22

A coating separator was manufactured according to the same method as Example 13 except for using the binder according to Example 10.

EXAMPLE 23

A coating separator was manufactured according to the same method as Example 13 except for using the binder according to Example 11.

EXAMPLE 24

A coating separator was manufactured according to the same method as Example 13 except for using the binder according to Example 12.

COMPARATIVE EXAMPLE 1

A coating separator was manufactured according to the same method as Example 13 except for using a 25 wt % polyvinylidene fluoride aqueous dispersion liquid (Solef 90000, Solvay; Brussels, Belgium) (27.2 g, NV conversion: 6.8 g, 10 wt % based on the entire weight of boehmite) as a binder.

4. Close Contacting Property Evaluation of Coating Layer

A 1.5 cm-wide adhesive tape (Celotape, trademark No. 405, Nichiban Co., Ltd.; Tokyo, Japan) was attached to each coating separator fixed on a stainless steel plate.

Then, a peeling tester (SHIMAZU EZ-S, Shimadzu Co.; Kyoto, Japan) was used to measure peel strength of the coating separator through a 180° peeling test.

The measured close contacting property evaluation results are provided in the following Table 1.

5. Thermal Shrinkage Evaluation

Figure 2:
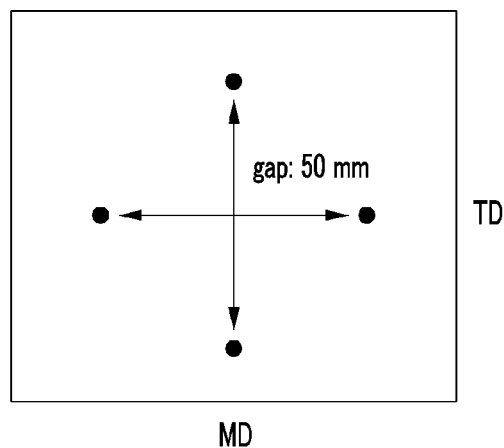
FIG. 2 is a schematic view showing samples for thermal shrinkage evaluation according to Examples.

As shown in FIG. 2, the coating separator was cut into a size of TD*MD=60 mm*80 mm and then, marked every 50 mm in a TD/MD direction by using a nonius.

The separator was inserted between an aluminum foil folded in a half and maintained in a 130° C. thermostat for 60 minutes. Subsequently, the separator was taken therefrom, the nonius was used to read the marked TD/MD distance, and a thermal shrinkage ratio was calculated according to the following formula.

The obtained thermal shrinkage evaluation results are provided in Table 1.

Shrinkage ratio (%)=((50−Distance after heating)/50)*100)

TABLE 1

| Binder | Coating separator | Peeling strength (mN/mm) | Shrinkage ratio (%) |
| --- | --- | --- | --- |
| Example 1 | Example 13 | 30 | 1.5 |
| Example 2 | Example 14 | 29 | 2 |
| Example 3 | Example 15 | 28 | 2 |
| Example 4 | Example 16 | 29 | 1.5 |
| Example 5 | Example 17 | 27 | 2 |
| Example 6 | Example 18 | 26 | 2 |
| Example 7 | Example 19 | 27 | 2 |
| Example 8 | Example 20 | 28 | 2 |
| Example 9 | Example 21 | 27 | 1.5 |
| Example 10 | Example 22 | 28 | 1.5 |
| Example 11 | Example 23 | 29 | 2 |
| Example 12 | Example 24 | 29 | 2 |
| PVDF | Comparative Example 1 | 5 | 3 |

Referring to the result of Table 1, the binders according to Examples 1 to 12, that is, the binders including an IPN-type acrylic-based resin comprising a hard segment having Tg ranging from greater than or equal to 50° C. and less than or equal to 200° C. and a soft segment having Tg ranging from greater than or equal to −100° C. and less than or equal to 30° C. showed more excellent heat resistance and adherence than a PVDF binder.

6. Preparation of Rechargeable Battery Cell

EXAMPLE 25

Preparation of Negative Active Mass Slurry 96 wt % of artificial graphite, 2 wt % of acetylene black, 1 wt % of a styrene butadiene copolymer (SBR) binder, and 1 wt % of carboxylmethyl cellulose (CMC) were mixed, and water was added thereto to adjust viscosity of the mixture, preparing a negative active mass slurry.

The negative active mass slurry had 48 wt % of a nonvolatile component based on the entire weight of the slurry.

Preparation of Negative Electrode

Subsequently, the negative active mass slurry was uniformly coated on a copper foil (a 10 μm-thick current collector) with a bar coater by adjusting the gap of the bar coater to coat the slurry in a coating amount (surface density) of the active mass of 9.55 mg/cm$^2$ after the drying.

Then, the negative active mass slurry was dried with a blow drier set at 80° C. for 15 minutes. The dried negative active mass was pressed to have mix density of 1.65 g/cm$^3$ with a roll presser.

Subsequently, the negative active mass was vacuum-dried at 150° C. for 6 hours, manufacturing a sheet-type negative electrode including a negative current collector and a negative active material layer.

Preparation of Positive Active Mass Slurry 96 wt % of solid solution oxide, $Li_{1.20}Mn_{0.55}Co_{0.10}Ni_{0.15}O_2$, 2 wt % of ketjen black, and 2 wt % of poly vinylidene fluoride were dispersed into N-methyl-2-pyrrolidone, preparing positive active mass slurry.

On the other hand, the positive active mass slurry had a nonvolatile component of 50 wt % based on the total mass of the slurry.

Manufacture of Positive Electrode

Subsequently, the positive active mass slurry was uniformly coated on an aluminum current collecting film with a bar coater by adjusting the gap of the bar coater to coat the slurry in a coating amount (surface density) of the active mass of 22.7 mg/cm² after the drying.

Subsequently, the positive active mass slurry was dried with a blow drier set at 80° C. for 15 minutes.

Then, the dried positive active mass was pressed to have mix density of 3.9 g/cm³ with a roll presser.

Subsequently, the positive active mass was vacuum-dried at 80° C. for 6 hours, manufacturing a sheet-type positive electrode including a positive electrode current collector and a positive active material layer.

Preparation of Rechargeable Lithium Ion Battery Cell

The negative electrode manufactured through the process was cut into a disk having a diameter of 1.55 cm, while the positive electrode manufactured through the process was cut into a disk having a diameter of 1.3 cm.

Subsequently, the coating separator according to Example 13 was cut into a disk having a diameter of 1.8 cm.

The positive electrode disk having a diameter of 1.3 cm, the coating separator disk having a diameter of 1.8 cm, the negative electrode disk having a diameter of 1.55 cm, and a 200 μm-thick copper foil disk having a diameter of 1.5 cm were sequentially stacked into a stainless steel coin container having a diameter of 2.0 cm.

Then, 150 μL of an electrolyte solution (1.4 M $LiPF_6$ dissolved in a mixed solution of ethylene carbonate/diethylcarbonate/fluoroethylene carbonate (=10/70/20 of a volume ratio)) was inserted into the container.

Subsequently, the container was covered with a stainless steel cap after inserting a polypropylene packing therebetween and sealed with an assembler.

Through this process, the separator according to Example 13 was used to manufacture a rechargeable lithium ion battery cell (a coin cell).

EXAMPLES 26 to 36 AND COMPARATIVE EXAMPLE 2

Rechargeable lithium ion battery cells according to Examples 26 to 36 and Comparative Example 2 were manufactured in the same method as Example 25 except for respectively using the separators in the following Table 2.

7. Cycle-life Evaluation

The rechargeable lithium ion battery cells according to Examples 25 to 36 and Comparative Example 2 were once charged and discharged at 25° C. and 0.2 C.

Then, the rechargeable lithium ion battery cells were 100 times charged and discharged at 1.0 C.

A discharge capacity retention (a percentage) was obtained by dividing discharge capacity at the 100th cycle (the 100th 1.0 C charge and discharge cycle) by discharge capacity at the first cycle (the 1st 1.0 C charge and discharge cycle). The higher the capacity retention, the better the cycle-life.

The results are provided in the following Table 2.

TABLE 2

| Coin cell | Separator | Capacity retention after 100 cycle (%) |
|---|---|---|
| Example 25 | Example 13 | 90 |
| Example 26 | Example 14 | 87 |
| Example 27 | Example 15 | 89 |
| Example 28 | Example 16 | 88 |
| Example 29 | Example 17 | 90 |
| Example 30 | Example 18 | 89 |
| Example 31 | Example 19 | 90 |
| Example 32 | Example 20 | 89 |
| Example 33 | Example 21 | 91 |
| Example 34 | Example 22 | 91 |
| Example 35 | Example 23 | 92 |
| Example 36 | Example 24 | 93 |
| Comparative Example 2 | Comparative Example 1 | 85 |

As shown in Table 2, the rechargeable lithium ion battery cells according to Examples 25 to 36 showed improved cycle characteristics compared with the one according to Comparative Example 2.

Based on the results, the binders of Examples 1 to 12 showed high heat resistance and strong adherence.

Hereinbefore, an exemplary embodiment of the present disclosure was illustrated in detail referring to the accompanied drawings, but the present disclosure is not limited thereto.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

For example, the binder according to an embodiment of the present disclosure is used for a rechargeable lithium ion battery in Examples but may also be used for other kinds of rechargeable batteries.

What is claimed is:

1. A binder for a rechargeable lithium ion battery comprising an interpenetrating polymer network (IPN)-type acrylic-based resin including a hard segment having a glass transition temperature (Tg) of greater than or equal to about 50° C. and less than or equal to about 200° C.; and a soft segment having a glass transition temperature (Tg) of greater than or equal to about −100° C. and less than or equal to about 30° C.,
    wherein the hard segment at least comprises one homopolymer selected from polymethacrylonitrile, poly N-(isobutoxymethyl)acrylamide and poly N-phenylmethacrylamide, and the soft segment comprises at least one homopolymer selected from polybutyl acrylate and poly 2-cyanoethylacrylate, and
    wherein the hard segment has a Hildebrand solubility parameter of greater than or equal to about 21 and less than or equal to about 25, and the soft segment has a Hildebrand solubility parameter of greater than or equal to about 16 and less than or equal to about 25.

2. The binder of claim 1, wherein the hard segment is having a glass transition temperature (Tg) of greater than or equal to about 50° C. and less than or equal to about 150° C.

3. A separator for a rechargeable lithium ion battery, comprising a substrate and a coating layer formed on at least one surface of the substrate, wherein the coating layer comprises a binder comprising an interpenetrating polymer network (IPN)-type acrylic-based resin including a hard segment having a glass transition temperature (Tg) of greater than or equal to about 50° C. and less than or equal to about 200° C.; and a soft segment having a glass transition temperature (Tg) of greater than or equal to about −100° C. and less than or equal to about 30° C.; and wherein the hard segment at least comprises one homopolymer selected from polymethacrylonitrile, poly N-(isobutoxymethyl)acrylamide and poly N-phenylmethacrylamide, and the soft segment comprises at least one homopolymer selected from polybutyl acrylate and poly 2-cyanoethylacrylate.

4. A rechargeable lithium ion battery comprising:

a positive electrode, a negative electrode, a separator, and a non-aqueous electrolyte; wherein the separator further comprises a substrate and a coating layer formed on at least one surface of the substrate, wherein the coating layer comprises a binder comprising an interpenetrating polymer network (IPN)-type acrylic-based resin including a hard segment having a glass transition temperature (Tg) of greater than or equal to about 50° C. and less than or equal to about 200° C.; and a soft segment having a glass transition temperature (Tg) of greater than or equal to about −100° C. and less than or equal to about 30° C.; and wherein the hard segment at least comprises one homopolymer selected from polymethacrylonitrile, poly N-(isobutoxymethyl)acrylamide and poly N-phenylmethacrylamide, and the soft segment comprises at least one homopolymer selected from polybutyl acrylate and poly 2-cyanoethylacrylate.

5. The rechargeable lithium ion battery of claim 4, wherein the coating layer of the separator further comprises an inorganic particle.

6. The rechargeable lithium ion battery of claim 4, wherein the binder comprises an interpenetrating polymer network (IPN)-type acrylic-based resin including a hard segment having a glass transition temperature (Tg) of greater than or equal to about 50° C. and less than or equal to about 150° C.; and a soft segment having a glass transition temperature (Tg) of greater than or equal to about −100° C. and less than or equal to about 30° C.

7. The rechargeable lithium ion battery of claim 4, wherein the hard segment of binder has a Hildebrand solubility parameter of greater than or equal to about 21 and less than or equal to about 25, and the soft segment has a Hildebrand solubility parameter of greater than or equal to about 16 and less than or equal to about 25.

8. The rechargeable lithium ion battery of claim 4 wherein charge-reaching voltage is greater than or equal to about 4.3 V and less than or equal to about 5.0 V.

9. The rechargeable lithium ion battery of claim 4, wherein the positive electrode further includes a current collector and a positive active material.

10. The rechargeable lithium ion battery of claim 9, wherein the positive active material comprises a solid-solution oxide selected from a group consisting of $Li_aMn_xCo_yNi_zO_2$ (1.150≤a≤1.430, 0.45≤x≤0.6, 0.10≤y≤0.15, 0.15≤z≤0.28), $LiMn_xCo_yNi_zO_2$ (0.3≤x≤0.85, 0.10≤y≤0.3, 0.10≤z≤0.3), and $LiMn_{1.5}Ni_{0.5}O_4$.

* * * * *